US008504800B2

(12) United States Patent
Gruenwald

(10) Patent No.: US 8,504,800 B2
(45) Date of Patent: Aug. 6, 2013

(54) SELF-SIMILAR PROCESSING NETWORK

(75) Inventor: Bjorn J. Gruenwald, Newtown, PA (US)

(73) Assignee: Hilbert Technology, Inc., Newtown, PA (US)

( * ) Notice: Subject to any disclaimer, the term of this patent is extended or adjusted under 35 U.S.C. 154(b) by 431 days.

(21) Appl. No.: 12/886,968

(22) Filed: Sep. 21, 2010

(65) Prior Publication Data

US 2011/0072240 A1    Mar. 24, 2011

Related U.S. Application Data

(60) Provisional application No. 61/244,312, filed on Sep. 21, 2009, provisional application No. 61/244,507, filed on Sep. 22, 2009.

(51) Int. Cl.
    *G06F 15/00*      (2006.01)
    *G06F 15/76*      (2006.01)

(52) U.S. Cl.
    USPC .......................................................... 712/30

(58) Field of Classification Search
    None
    See application file for complete search history.

(56) References Cited

U.S. PATENT DOCUMENTS

2009/0216910 A1*   8/2009   Duchesneau ................. 709/250
2009/0254572 A1*  10/2009   Redlich et al. .................. 707/10

* cited by examiner

*Primary Examiner* — Corey S Faherty
(74) *Attorney, Agent, or Firm* — Womble Carlyle Sandridge & Rice, LLP

(57) ABSTRACT

Self-similar processing by unit processing cells may together solve a problem. A unit processing cell may include a processor, a memory and a plurality of Input/Output (IO) channels coupled to the processor. The memory may include a dictionary having one or more instructions that configure the processor to perform at least one function. The plurality of IO channels may be used to communicably couple the unit processing cell with a plurality of other unit processing cells each including their own respective dictionary. The unit processing cell and the plurality of other unit processing cells may be independent of one another and may perform together without a centralized control. The processor may update the dictionary so that the unit processing cell builds a different dictionary from the plurality of other unit processing cells, thereby being self-similar to the plurality of other unit processing cells.

20 Claims, 3 Drawing Sheets

SELF-SIMILAR PROCESSING NETWORK

CROSS-REFERENCE TO RELATED APPLICATIONS

This application claims priority to U.S. Provisional Patent Application Ser. No. 61/244,507, filed Sep. 22, 2009; and U.S. Provisional Patent Application Ser. No. 61/244,312, filed Sep. 21, 2009, both of which are hereby incorporated by reference herein in their entirety.

TECHNICAL FIELD

The disclosure relates generally to parallel processing and more specifically, to a network of parallel processors having properties of self-similarity.

BACKGROUND

Nature abounds with forms that are "self-similar." For example, from a distance, leaves on an oak tree appear to an observer to be identical to one another. As the observer draws closer, similarities among the leaves are readily ascertained (so much so in fact, that the observer can readily identify an individual leaf as an oak leaf) while differences between individual leaves become apparent. Subtle (and sometimes not so subtle) differences in size, shape, color, vein structure and other differences become clear upon closer observation to the point where each individual oak leave is distinct. Despite various differences, each leaf functions in a manner virtually identical to that of each other leaf on the oak tree as well as other oak trees. This concept of similar but distinct is referred to as "self-similarity" and is described in further detail in "The Natural Basis of Contractile Phenomena" by Bjorn J. Gruenwald, University of Pennsylvania, Philadelphia, Pa., December 1975, a copy of which is attached and incorporated herein by reference in its entirety and "The Natural Basis of Contractile Phenomena" by Bjorn J. Gruenwald, University of Pennsylvania, Philadelphia, Pa., September 1977, a copy of which is also attached and incorporated herein by reference in its entirety.

Further examples include stem cells. Stem cells are virtually identical to one another. Each stem cell assumes a function or specialty and then adapts to a form that performs that function or specialty. Any stem cell can assume any function or specialty. Other examples exist.

In a parallel computing environment, multiple processors operate "in parallel" so that large complex tasks can be broken down into smaller tasks. The smaller tasks are performed on one or more of the multiple processors so that at least some of the smaller tasks can be performed in parallel thereby reducing processing time. Parallel computing environments suffer from one or more shortcomings including but not limited to, synchronization, messaging, supervision, task allocation, timing, shared memory, complexity, and other shortcomings.

What is needed is an improved parallel computing environment.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
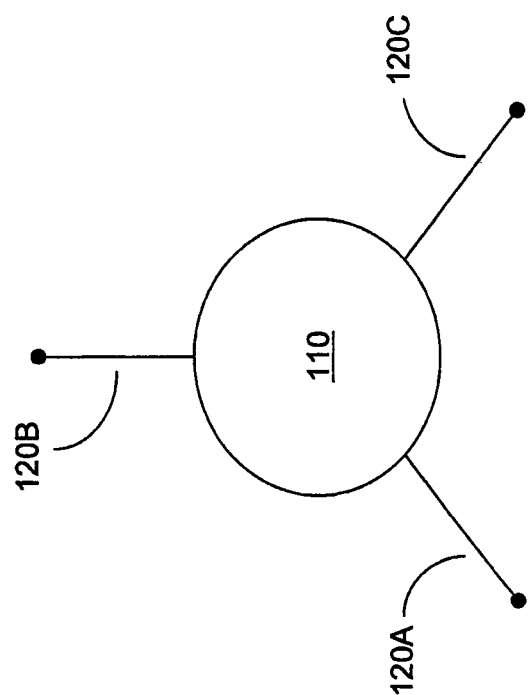
FIG. 1 illustrates a unit processing cell in accordance with various implementations of the invention.

FIG. 1 illustrates a unit processing cell 110 in accordance with various implementations of the invention. Unit processing cell 110 is coupled to one or more input/output data buses 120 ("I/O bus 120"), which are illustrated in FIG. 1 as an I/O bus 120A, an I/O bus 120B, and an I/O bus 120C. In various implementations of the invention, fewer or more I/O buses 120 may be used than depicted in FIG. 1.

Figure 2:
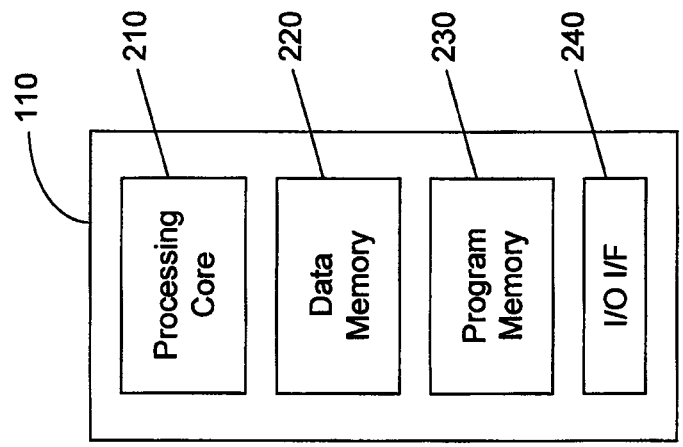
FIG. 2 illustrates a block diagram of a unit processing cell in accordance with various implementations of the invention.

FIG. 2 illustrates a block diagram of unit processing cell 110 in accordance with various implementations of the invention. Unit processing cell 110 includes various processing components 200 including a processing core 210, a data memory 220, a program memory 230, and a communications interface 240.

In some implementations of the invention, processing core 210 comprises a commercially available processor as would be appreciated. In some implementations of the invention, processing core 210 comprises a processor with a limited set of instructions, primitives, or opcodes. In these implementations of the invention, various features, functionality and/or capability of the commercially available processor may not be necessary for the invention and hence may not be utilized. In some implementations of the invention, the processor is selected and/or designed to provide specific performance capabilities as necessary to achieve various aspects of the invention.

In some implementations of the invention, data memory 220 comprises a small amount of memory (e.g., 1K, 10K, 100K) that may be used to store data associated with a state(s) or a variable(s) managed by unit processing cell 110. In some implementations of the invention, data memory 220 may comprise smaller or larger amounts of memory. In some implementations of the invention, an amount of memory is selected to provide specific performance capabilities as necessary to achieve various aspects of the invention as would be apparent.

In some implementations of the invention, program memory 230 comprises a small amount of memory (e.g., 1K, 10K, 100K) necessary to store various instruction sequences, including, by way of example, but not limitations, routines, modules, functions, programs, objects, threads, scripts, or other instruction sequences associated with one or more processes or functions performed by unit processing cell 110. In some implementations of the invention, program memory 230 may comprise smaller or larger amounts of memory. In some implementations of the invention, an amount of memory is selected to provide specific performance capabilities as necessary to achieve various aspects of the invention.

In some implementations of the invention, communications interface 240 provides a data interface between an external data bus (e.g., I/O bus 120) and processing core 210. In some implementations of the invention, communications interface 240 comprises a data interface to a parallel N-bit data bus. In some implementations of the invention, communications interface 240 comprises a data interface to a serial N-bit data bus. In some implementations of the invention, communications interface 240 comprises other forms of data interfaces to various data communications protocols and/or standards as would be apparent. In some implementations of the invention, a number of bits, N, of the data bus is selected based on processing core 210. In some implementations of the invention, the number of bits, N, is selected to provide specific performance capabilities as necessary to achieve various aspects of the invention.

As would be apparent, one or more of processing components 200 may be integrated with one another. By way of example, but not limitation, data memory 220 and program memory 230 may be combined as a single memory that may or may not be partitioned as separate memory forms. By way of further example, but not limitation, processing core 210 may include various data memory 220 and/or program memory 230 on board. Similarly, by way of example, but not limitation, processing core 210 may be integrated directly with communications interface 240 as would be apparent.

Figure 3:
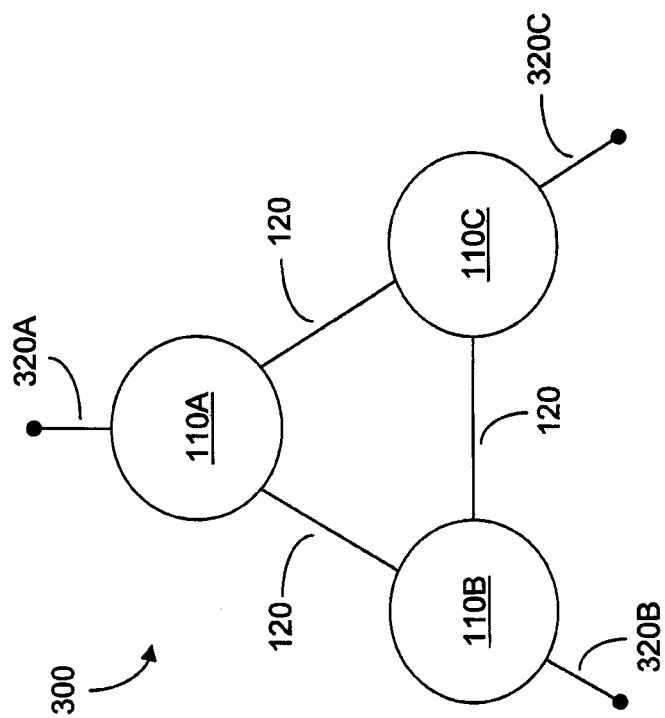
FIG. 3 illustrates a two-dimensional primary processing network in accordance with various implementations of the invention.

FIG. 3 illustrates a two-dimensional primary processing network 300 in accordance with various implementations of the invention. Primary processing network 300 includes a number of unit processing cells 110 illustrated in FIG. 3 as a unit processing cell 110A, a unit processing cell 110B, and a unit processing cell 110C. While primary processing network 300 is illustrated in FIG. 3 as having three unit processing cells 110, fewer or more unit processing cells 110 may be used. Each unit processing cell 110 is coupled to at least one other unit processing cell 110 via I/O bus 120. More particularly, as illustrated in FIG. 3, unit processing cell 110A is coupled to unit processing cell 110B and to unit processing cell 110C; likewise, unit processing cell 110B is coupled to unit processing cell 110A and to unit processing cell 110C; and likewise, unit processing cell 110C is coupled to unit processing cell 110A and to unit processing cell 110B.

As illustrated, I/O buses 120 provide internal couplings among unit processing cells 110 of primary processing network 300. In addition, I/O buses 320 provide one or more external couplings from primary processing network 300 to other components (not otherwise illustrated in FIG. 3). More particularly as illustrated in FIG. 3, an I/O bus 320A provides an external coupling to primary processing network 300 via unit processing cell 110A; an I/O bus 320B provides an external coupling to primary processing network 300 via unit processing cell 110B; and an I/O bus 320C provides an external coupling to primary processing network 300 via unit processing cell 110C. In some implementations of the invention, fewer or more external I/O buses 320 may be utilized.

Figure 4:
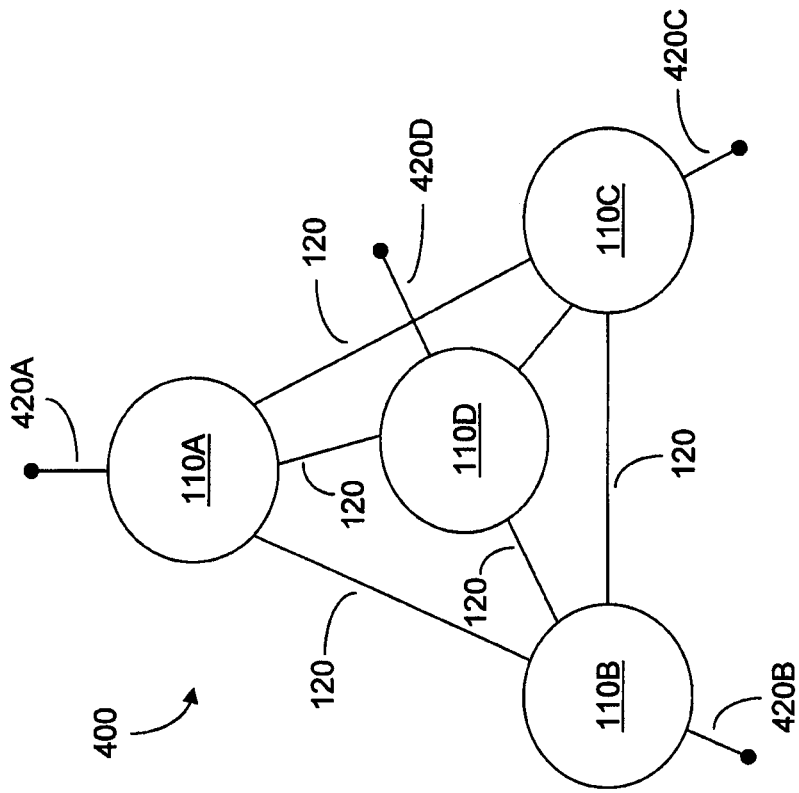
FIG. 4 illustrates a three-dimensional primary processing network in accordance with various implementations of the invention.

FIG. 4 illustrates a three-dimensional primary processing network 400 in accordance with various implementations of the invention. Primary processing network 400 includes a number of unit processing cells 110 illustrated in FIG. 4 as a unit processing cell 110A, a unit processing cell 110B, a unit processing cell 110C, and a unit processing cell 110D. While primary processing network 400 is illustrated in FIG. 4 as having four unit processing cells 110, fewer or more unit processing cells 110 may be utilized. Each unit processing cell 110 is coupled to at least one other unit processing cell 110 via I/O bus 120. More particularly, as illustrated in FIG. 4, unit processing cell 110A is coupled to unit processing cell 110B, to unit processing cell 110C, and to unit processing cell 110D; likewise, unit processing cell 110B is coupled to unit processing cell 110A, to unit processing cell 110C, and to unit processing cell 110D; likewise, unit processing cell 110C is coupled to unit processing cell 110A, to unit processing cell 110B, and to unit processing cell 110D; and likewise, unit processing cell 110D is coupled to unit processing cell 110A, to unit processing cell 110B, and to unit processing cell 110C.

As illustrated in FIG. 4, I/O buses 120 provide internal couplings among unit processing cells 110 of primary processing network 400. In addition, I/O buses 420 provide one or more external couplings from primary processing network 400 to other components (not otherwise illustrated in FIG. 4). More particularly as illustrated in FIG. 4, an I/O bus 420A provides an external coupling to primary processing network 400 via unit processing cell 110A; an I/O bus 420B provides an external coupling to primary processing network 400 via unit processing cell 110B; an I/O bus 420C provides an external coupling to primary processing network 400 via unit processing cell 110C; and an I/O bus 420D provides an external coupling to primary processing network 400 via unit processing cell 110D. In some implementations of the invention, fewer or more external I/O buses 420 may be utilized.

Figure 5:
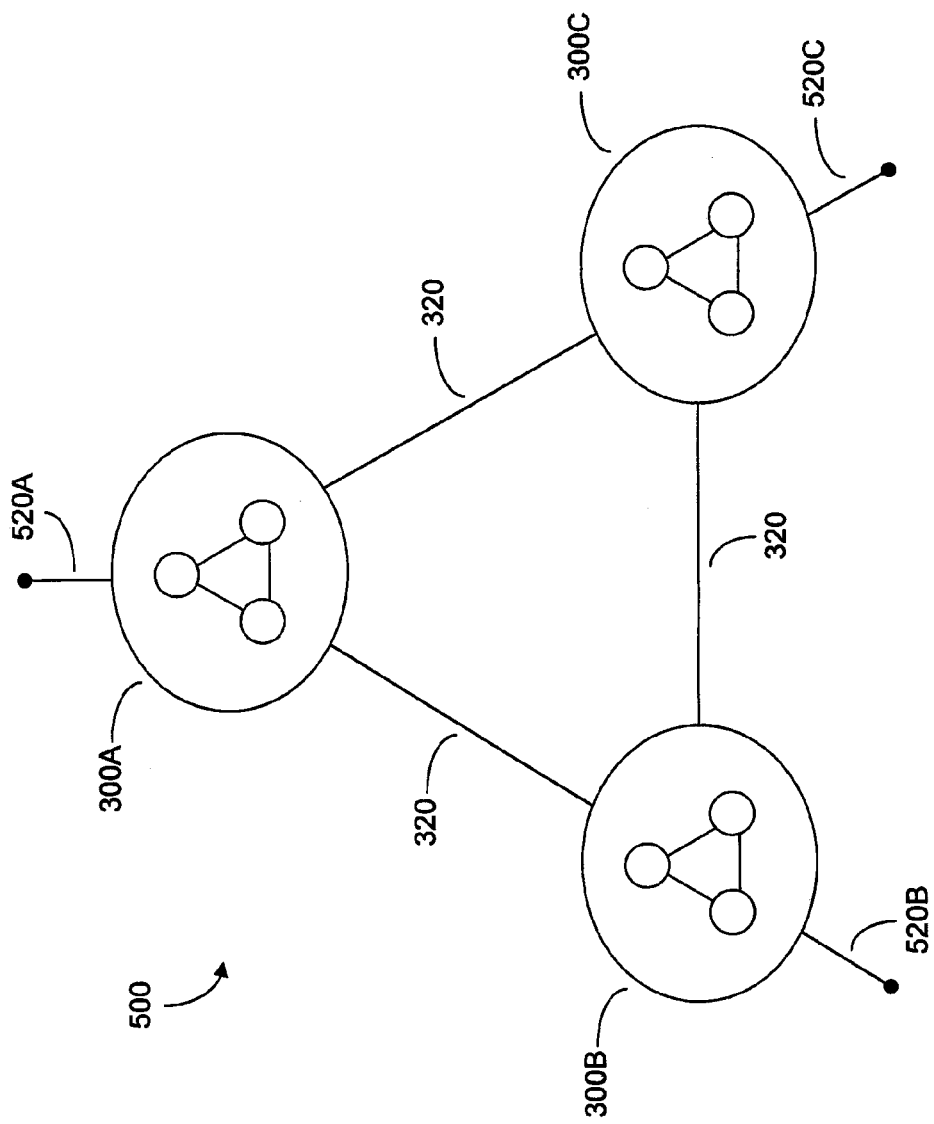
FIG. 5 illustrates an exemplary self-similar processing network in accordance with various implementations of the invention.

According to various implementations of the invention, primary processing networks 300, 400 form basic building blocks for a self-similar processing network 500 such as is illustrated in FIG. 5. For purposes of this disclosure, various aspects of the invention are described with reference to primary processing network 300; however, various implementations of the invention may be readily extended to utilize primary processing network 400.

Referring now to FIG. 5, self-similar processing network 500 includes a number of primary processing networks 300 illustrated in FIG. 5 as a primary processing network 300A, a primary processing network 300B, and a primary processing network 300C. While self-similar processing network 500 is illustrated in FIG. 5 as having three primary processing networks 300 arranged in two dimensions, fewer or more primary processing networks 300 may be used in two or three dimensions. In some implementations of the invention, tens, hundreds, thousands or more of primary processing networks 300 may be used to form self-similar processing network 500.

As illustrated in FIG. 5, each primary processing network 300 is coupled to at least one other primary processing network 300 via external I/O bus 320. More particularly, as illustrated in FIG. 5, primary processing network 300A is coupled to primary processing network 300B and to primary processing network 300C; likewise, primary processing network 300B is coupled to primary processing network 300A and to primary processing network 300C; and likewise, primary processing network 300C is coupled to primary processing network 300A and to primary processing network 300B.

As illustrated in FIG. 5, I/O buses 320 provide internal couplings among primary processing networks 300 of self-similar processing network 500. In addition, I/O buses 520 provide one or more external couplings from self-similar processing network 500 to other components (not otherwise illustrated in FIG. 5). More particularly as illustrated in FIG. 5, an I/O bus 520A provides an external coupling to self-similar processing network 500 via primary processing network 300A; an I/O bus 520B provides an external coupling to self-similar processing network 500 via primary processing network 300B; and an I/O bus 520C provides an external coupling to self-similar processing network 500 via primary processing network 300C. In some implementations of the invention, fewer or more external I/O buses 520 may be utilized.

In accordance with various implementations of the invention, each unit processing cell 110 in self-similar processing network 500 has one or more of the following characteristics: 1) independent; 2) asynchronous; and 3) frequency agnostic. One or more of these characteristics may assist self-similar processing network 500 in overcoming various short-comings of conventional parallel computing environments. These characteristics are now described in further detail.

According to various implementations of the invention, each unit processing cell 110 is independent from one another. In particular, self-similar processing network 500 does not include a notion of "centralized control." In other words, no single unit processing cell 110 or group of unit processing cells 110 are deemed "masters" or "slaves." Each unit processing cell 110 operates based on instruction sequences stored in its program memory 230, data stored in its data memory 220, commands it receives via I/O bus 120, and its current state (e.g., busy or not busy).

According to various implementations of the invention, each unit processing cell 110 runs asynchronously from one another. In particular, self-similar processing network 500 does not attempt to synchronize unit processing cells 110 or data/commands transferring between them (except, however, in the context of handshaking over I/O buses 120).

According to various implementations of the invention, each unit processing cell 110 may run at a different clock speed as one or more other unit processing cells 110. In other words, each unit processing cell 110 is frequency agnostic from other unit processing cells 110 in self-similar processing network 500.

According to various implementations of the invention, each unit processing cell 110 is provided with an initial dictionary or set of instructions or instruction sequences (individual instructions and/or instruction sequences referred to as "words") that provide various elemental functions (e.g., store, load, add, shift, etc.). In some implementations of the invention, this initial dictionary may comprise the predetermined opcodes built into the processor of unit processor cell 110. In some implementations of the invention, this initial dictionary may comprise an instruction set associated with processing core 210. In some implementations of the invention, this initial dictionary is stored in program memory 230. In some implementations of the invention, an initial dictionary comprised of instruction sequences may be provided to one of unit processing cells 110 in self-similar processing network 500 and distributed to various other unit processing cells 110. In some implementations of the invention, the initial dictionary may comprise an instruction set associated with processing core 210 along with additional instructions sequences distributed through self-similar processing network 500.

According to various implementations of the invention, new words may be added to the dictionary of various ones of unit processing cells 110. Typically, these new words are defined in terms of words already existing in a given dictionary. Because program memory 230 is of finite size, the dictionary associated with each unit processing cells 110 may be similarly limited. Accordingly, in some implementations of the invention, each unit processing cell 110 may limit the size of its dictionary by deciding whether to learn new words at the expense (i.e., elimination) of old words or to maintain the old words at the expense (i.e., refusal to learn) new words. Each individual unit processing cell 110 typically makes the decision whether to learn or not unless externally commanded to do so by another unit processing cell 110.

According to various implementations of the invention, each unit processing cell 110 operates in one of two modes: 1) a learn mode or 2) an execute mode. In the learn mode, unit processing cell 110 learns a new word and adds the new word to its dictionary. In various implementations of the invention, unit processing cell 110 may not "understand" all the words that form the new word and may have to ask other unit processing cells 110 to teach it one or more other words. In the execute mode, unit processing cell 110 executes a word from its dictionary.

The mode in which unit processing cell 110 operates depends on a command it receives over I/O bus 120. Each command specifies that its payload is a word to be learned or a word to be executed. When unit processing cell 110 receives a command, it may chose to ignore the command or accept the command. In some implementations of the invention, whether unit processing cell 110 ignores or accepts the command may be dependent on various factors which may include: 1) its state (e.g., busy or not busy); 2) its knowledge/recognition of the word (i.e., whether the word exists in its dictionary); 3) the nature of the command (e.g., a "force" learn command); or 4) other factors. In some implementations of the invention, ignored commands are passed along by the ignoring unit processing cell 110 to one or more other unit processing cells 110 to which the ignoring unit processing cell 110 is coupled until the command is accepted.

Over time, various ones of unit processing cells 110 build different dictionaries and thus, provide different functionality to self-similar processing network 500. In this context, each unit processing cell 110 is virtually identical to every other unit processing cell 110 with the exception of each one's dictionary which makes each one distinct. In this way, each unit processing cell 110 is "self-similar."

Self-similar processing network 500 may be used to solve a complex problem by breaking it into one or more simpler problems and solving the simpler problem(s). As described in the attached papers by Bjorn J. Gruenwald, a complex problem may be solved by expressing the complex problem in a different reference frame where the complex problem becomes a series of simpler problems. Expressed in the reference frame, the simpler problems may be readily solved and expressions and/or results for the complex problem may be determined.

In the interest of clarity, not all of the routine features of the implementations described herein are illustrated and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure. Furthermore, various combinations of various ones of the features disclosed herein may be made as would be apparent even though such combinations are not expressly described herein.

In accordance with this disclosure, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible storage medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of storage media.

While various implementations and applications have been shown and described, it would be apparent to those skilled in the art having the benefit of this disclosure that many more modifications than mentioned above are possible without departing from the inventive concepts disclosed herein.

What is claimed is:

1. A unit processing cell, comprising:
    at least one processor;
    a memory comprising:
        a dictionary comprising one or more instructions that configure the at least one processor to perform at least one function; and
        a plurality of Input/Output (IO) channels communicably coupled to the at least one processor,
    wherein the plurality of IO channels are configured to communicably couple the unit processing cell with a plurality of other unit processing cells, each of the plurality of other unit processing cells comprising their own respective dictionary,
    wherein the unit processing cell and the plurality of other unit processing cells are independent of one another and configured to perform together without a centralized control,
    wherein the at least one processor is configured to update the dictionary so that the unit processing cell is configured to build a different dictionary from the plurality of other unit processing cells, thereby being self-similar to the plurality of other unit processing cells.

2. The unit processing cell of claim 1, wherein the unit processing cell and the plurality of other unit processing cells are substantially the same as one another except for their respective dictionaries.

3. The unit processing cell of claim 1, wherein the plurality of IO channels comprise N−1 IO channels that each couple the unit processing cell with at least one of the plurality of other unit processing cells, wherein N is a number representing the unit processing cell and the plurality of other unit processing cells coupled to the unit processing cell.

4. The unit processing cell of claim 1, wherein the unit processing cell and the plurality of other unit processing cells are frequency agnostic with respect to one another.

5. The unit processing cell of claim 1, wherein the unit processing cell and the plurality of other unit processing cells are configured to execute asynchronously with respect to one another.

6. The unit processing cell of claim 1, wherein the at least one processor is configured to limit the dictionary, wherein the dictionary is limited to a finite number of the one or more instructions.

7. The unit processing cell of claim 6, wherein the at least one processor is configured to limit the dictionary by one or more of: learn a new instruction at the expense of an existing instruction; refuse to learn a new instruction; or receive a command that determines whether to learn a new instruction.

8. The unit processing cell of claim 1, wherein the at least one processor is configured to receive a command and make a decision to ignore or accept the command.

9. The unit processing cell of claim 8, wherein the decision whether to ignore or accept the command depends on one or more of: a state of the unit processing cell, a recognition of the command in the dictionary, or a nature of the command.

10. A self-similar processing network, comprising:
    a plurality of unit processing cells each communicably coupled to one another,
    wherein each of the plurality of unit processing cells comprise:
        at least one processor;
        a memory comprising a dictionary comprising one or more instructions that configure the at least one processor to perform at least one function, and
        a plurality of Input/Output (IO) channels communicably coupled to the at least one processor, wherein each of the plurality of IO channels is configured to communicably couple one of the plurality of unit processing cells with another one of the plurality of unit processing cells,
    wherein each of the plurality of unit processing cells are configured to execute independently of one another so that the plurality of unit processing cells executes without a centralized control,
    wherein each of the at least one processor is configured to update each respective dictionary so that each of the plurality of unit processing cells build different dictionaries from one another, thereby being self-similar to the plurality of other unit processing cells.

11. The self-similar processing network of claim 10, wherein the self-similar processing network is coupled to one or more other self-similar processing networks each comprising their own plurality of unit processing cells.

12. The self-similar processing network of claim 11, wherein the self-similar processing network is coupled to the one or more other self-similar processing networks via a coupling between a unit processing cell of the self-similar processing network and at least one unit processing cell of the one or more other self-similar processing networks.

13. A computer-implemented method of self-similar processing to solve a problem, comprising:
    updating, by at least one of processor of a unit processing cell communicably coupled to a plurality of other unit processing cells, a dictionary of the unit processing cell, wherein the dictionary comprises one or more instructions configuring the at least one processor to perform at least one function used to at least partially solve the problem,
    wherein the solution to the problem is attempted together by the unit processing cell and a plurality of other unit processing cells each comprising their own respective dictionaries,
    wherein the updating causes the dictionary to be different from the respective dictionaries of the plurality of other unit processing cells, thereby causing the unit processing cell to be self-similar to the plurality of other unit processing cells;
    processing, by the at least one processor, the at least one function independently from the plurality of other unit processing cells, the unit processing cell and each of the plurality of other unit processing cells processing their respective at least one function to solve the problem without a centralized control; and
    communicating, by the at least one processor using a plurality of Input/Output (IO) channels, information based on the processing to the plurality of other unit processing cells to attempt to solve the problem based on their self-similarity.

14. The computer-implemented method of claim 13, wherein the unit processing cell and the plurality of other unit processing cells are substantially the same as one another except for their respective dictionaries.

15. The computer-implemented method of claim 13, wherein the plurality of IO channels comprise N−1 IO channels that each couple the unit processing cell with at least one of the plurality of other unit processing cells, wherein N is a number representing the unit processing cell and the plurality of other unit processing cells coupled to the unit processing cell.

16. The computer-implemented method of claim 13, wherein the unit processing cell and the plurality of other unit processing cells are frequency agnostic with respect to one another.

17. The computer-implemented method of claim 13, further comprising:
executing, by the at least one processor, asynchronously with respect to the plurality of other unit processing cells.

18. The computer-implemented method of claim 13, further comprising:
limiting, by the at least one processor, the dictionary to a finite number of the one or more instructions.

19. The computer-implemented method of claim 18, wherein limiting the dictionary further comprises limiting the dictionary by one or more of:
learning a new instruction at the expense of an existing instruction; refusing to learn a new instruction; or receiving a command that determines whether to learn a new instruction.

20. The computer-implemented method of claim 13, further comprising:
receiving, by the at least one processor, a command and making a decision to ignore or accept the command.

* * * * *